(12) United States Patent
Di Meo et al.

(10) Patent No.: US 6,984,759 B2
(45) Date of Patent: Jan. 10, 2006

(54) PROCESS FOR THE PREPARATION OF PERFLUOROPOLYETHERS HAVING ALDEHYDE, ALCOHOL, AMINE END GROUPS BY CATALYTIC REDUCTION

(75) Inventors: Antonella Di Meo, Milan (IT); Rosaldo Picozzi, Milan (IT); Claudio Tonelli, Milan (IT)

(73) Assignee: Solvay Solexis S.p.A., Milan (IT)

( * ) Notice: Subject to any disclaimer, the term of this patent is extended or adjusted under 35 U.S.C. 154(b) by 7 days.

(21) Appl. No.: 10/630,698

(22) Filed: Jul. 31, 2003

(65) Prior Publication Data

US 2004/0068144 A1 Apr. 8, 2004

(30) Foreign Application Priority Data

Aug. 1, 2002 (IT) ..................... MI2002A1734

(51) Int. Cl.
  *C07C 209/00* (2006.01)
  *C07C 209/44* (2006.01)
  *C07C 45/00* (2006.01)
  *C07C 41/18* (2006.01)

(52) U.S. Cl. ............ 564/489; 564/490; 564/491; 564/505; 564/463; 564/474; 564/483; 568/484; 568/485; 568/488; 568/489; 568/490; 568/589; 568/615

(58) Field of Classification Search ............ 564/489, 564/490, 491, 505, 463, 474, 483; 568/484, 568/485, 488, 489, 490, 589, 615
See application file for complete search history.

(56) References Cited

U.S. PATENT DOCUMENTS

| | | | |
|---|---|---|---|
| 3,766,251 A | 10/1973 | Caporiccio et al. | 560/223 |
| 3,810,874 A | 5/1974 | Mitsch et al. | |
| 3,847,978 A | 11/1974 | Sianesi et al. | 562/577 |
| 5,446,205 A | 8/1995 | Marchionni et al. | |
| 6,054,615 A | 4/2000 | Qiu | |

FOREIGN PATENT DOCUMENTS

| | | |
|---|---|---|
| EP | 0 349 115 | 5/1989 |
| EP | 0 870 778 A1 | 10/1998 |
| EP | 1 114 842 A2 | 7/2001 |
| WO | WO 98/37043 | 8/1998 |

OTHER PUBLICATIONS

O.R. Pierce, T. G. Cane, J. Am. Chem. Soc. 76, 300 (1954).

*Primary Examiner*—Rosalynd Keys
(74) *Attorney, Agent, or Firm*—ArentFox, PLLC

(57) ABSTRACT

Process for the perfluoropolyether preparation having reactive end groups —$CH_2NH_2$, —CHO, —$CH_2OH$, by reduction of the corresponding perfluoropolyethers having —CN, —COCl, —CHO end groups by using gaseous hydrogen in the presence of a catalyst constituted by Pd, Rh, or Ru, supported on solid metal fluorides, at a temperature from 20° C. to 150° C. and under a pressure between 1 and 50 atm.

15 Claims, No Drawings

PROCESS FOR THE PREPARATION OF PERFLUOROPOLYETHERS HAVING ALDEHYDE, ALCOHOL, AMINE END GROUPS BY CATALYTIC REDUCTION

The present invention relates to a process for the preparation of perfluoropolyethers (PFPEs) containing reactive end groups.

More specifically the invention relates to a process for the preparation with high yields, even greater than 90%, perfluoro-polyethers containing reactive end groups starting from the corresponding perfluoropolyether precursors containing end groups reducible with hydrogen in the presence of supported metal catalysts. More in detail the invention relates to a catalytic hydrogenation process of PFPE having reducible end groups, such as nitriles, acylchlorides, aldehydes, to give the corresponding compounds with amine, aldehyde, alcohol end groups, said reduction being carried out with hydrogen in the presence of catalysts formed by transition metals of the VIII group supported on inorganic fluorides.

Processes to convert ester or acyl fluorides end groups of perfluoropolyethers into the corresponding primary alcohols by reduction with metal hydrides, for example $LiAlH_4$, are known. However said processes are industrially hardly manageable.

Perfluoropolyethers having amine end groups are obtained from the corresponding perfluoropolyethers having fluorosulphonic ester end groups by reaction with ammonia or primary hydrogenated amines. See U.S. Pat. Nos. 3,810,874, 3,766,251, 5,446,205. Said processes show a poor conversion and/or selectivity in the primary amine.

Among the known methods to obtain the aldehyde derivatives of fluorinated compounds, the chemical reduction with carbonyl precursor hydrides can be mentioned. They however give very low yields. Only in the case of the trifluoroacetic ester, by reduction with $LiAlH_4$ in ethyl ether at $-78°$ C. the corresponding aldehyde is obtained with a 71% yield (O. R. Pierce, T. G. Cane, J. Am. Chem. Soc. 76, 300 (1954)). The Applicant has found that by processes of chemical reduction with hydrides starting from PFPE derivatives containing carbonyl groups (esters, acyl-fluorides and/or -chlorides) only the corresponding alcohol derivatives are obtained, while the aldehyde derivatives, when present, form a by-product.

A catalytic hydrogenation process for preparing fluorinated amines from nitrite compounds, by using metal-Raney as catalyst (U.S. Pat. No. 6,054,615), in particular Co-Raney, is known. However said process is not selective since it does not solely obtain the primary amine, but a primary, secondary and tertiary amine mixture which are difficult to be separated.

The Applicant has found that by using the hydrogenation process with Co-Raney on PFPE nitrites no conversion is obtained (see the comparative Examples).

The need was felt to have available a process having a high yield, even higher than 90%, to obtain from perfluoropolyether precursors having acyl-chloride, aldehyde or nitrile end groups the corresponding reduction compounds with aldehyde, alcohol, amine end groups.

The Applicant has surprisingly and unexpectedly found a catalytic reduction process to obtain high conversions and yields, even higher than 90% in the aforesaid reduction compounds.

An object of the present invention is therefore a high yield process for the preparation of perfluoropolyethers with aldehyde, alcohol, amine end groups, having structure (I):

$$T-CFX'-O-R_f-CFX-T' \qquad (I)$$

wherein:
T is $-F$, $C_1-C_3$ perfluoroalkyl, $-CH_2OH$, $-CH_2NH_2$, $-CHO$;
T'=T with the proviso that when T is F or $C_1-C_3$ perfluoroalkyl, T' is $-CH_2OH$, $-CH_2NH_2$, $-CHO$;
X, X', equal to or different from each other, are $-F$ or $-CF_3$;
$R_f$ is selected from:
$-(C_2F_4O)_m(CF_2CF(CF_3)O)_n(CF_2O)_p(CF(CF_3)O)_q-$
where in:
the sum n+m+p+q ranges from 2 to 200, the (p+q)/(m+n+p+q) ratio is lower than or equal to 10:100, preferably comprised between 0.5:100 and 4:100, the n/m ratio ranges from 0.2 to 6, preferably from 0.5 to 3; m, n, p, q are equal to or different from each other and when m, n range from 1 to 100, preferably from 1 to 80, then p, q range from 0 to 80, preferably from 0 to 50; the units with n, m, p, q indexes being statistically distributed along the chain;
$-(CF_2CF_2CF_2O)_r-$ wherein r ranges from 2 to 200,
$-(CF(CF_3)CF_2O)_s-$ wherein s ranges from 2 to 200,
comprising the following steps:
A) preparation of perfluoropolyethers of formula $$T''-CFX'-O-R_f-CFX-COF \qquad (II)$$

wherein T" is $-COF$, $-F$, or $C_1-C_3$ perfluoroalkyl, X, X', and $R_f$ are as above, by reduction of the corresponding perfluoropolyethers containing peroxidic bonds, obtainable by photooxidation of tetrafluoroethylene and/or perfluoropropene, using gaseous hydrogen in the presence of a catalyst formed by metals of the VIII group supported on metal fluorides, optionally in the presence of perfluorinated solvents, inert at a temperature from $20°$ C. to $140°$ C., preferably from $80°$ C. to $130°$ C. and at a pressure between 1 and 50 atm, preferably between 1 and 10 atm;
B) treatment of the formula (II) compounds with inorganic chlorides, preferably $CaCl_2$, by heating at a temperature in the range $100°-150°$ C. obtaining perfluoropolyethers having acylfluoride $-COF$ end groups;
B') treatment of the formula (II) acylchloride or of the corresponding ester or of the corresponding acylchloride with gaseous ammonia, obtaining the corresponding amide, subsequently dehydrated with a dehydrating agent, for example with $P_2O_5$, at a temperature in the range $150°-200°$ C., preferably at $170°$ C., with the obtainment of perfluoropolyethers with nitrile $-CN$ end groups;
C) reduction of the perfluoropolyethers with acylchloride end groups, obtained in step B), or with nitrile end groups, obtained in step B'), of formula (IIa):

$$T'''-CFX'-O-R_f-CFX-T'''' \qquad (IIa)$$

wherein:
$T'''=-F$, $C_1-C_3$ perfluoroalkyl, $-CN$, $-COCl$,
$T''''=T'''$ with the proviso that when T''' is $-F$ or $C_1-C_3$ perfluoroalkyl,
T'''' is $-CN$, $-COCl$,
by using gaseous hydrogen in the presence of a catalyst constituted by metals of the VIII group selected from Pd, Rh, Ru, supported on solid metal fluorides, stable under the reaction conditions, at a temperature from $20°$ C. to $150°$ C., preferably from $80°$ C. to $120°$ C. and at a pressure between 1 and 50 atm, preferably between 1 and 10 atm, optionally in the presence of inert solvents, obtaining the formula (I) compounds.

Step A) is described in a copending patent application MI2002A 001733 (corresponding to U.S. application Ser. No. 10/631,862) filed at the same time as the present application and herein incorporated by reference and, in particular step A) can be carried out in a continuous or discontinuous way, preferably removing the HF formed during the reaction, for example by means of the same inlet hydrogen flow.

As metals of the VIII group, Pd, Pt, Rh can be mentioned.

The preferred metal fluorides usable as supports are metal fluorides, or complex metal fluorides or mixtures thereof, solid under the reaction conditions excluding those forming in the presence of HF stable hydrofluorides, such for example KF or NaF or showing a solubility in HF higher than 10% by weight.

More preferably the metal fluorides are selected from the group formed by $CaF_2$, $BaF_2$, $MgF_2$, $AlF_3$, still more preferably $CaF_2$.

The concentration of the VIII group metal on the support is comprised between 0.1% and 10% with respect to the total weight of the catalyst, preferably between 1% and 2% by weight.

The used catalyst amount is in the range 1%–10%, preferably 1%–5% by weight with respect to the peroxidic perfluoropolyether of A) to be reduced.

In particular the preferred structures of the perfluorooxyalkylene chain $R_f$ are selected from the following:
—$(CF_2CF_2O)_m$—$(CF_2O)_p$—,
—$(CF_2CF(CF_3)O)_n$—$(CF_2O)_p$—$(CF(CF_3)O)_q$
wherein the indexes have the above meanings.

Step B) is carried out by a solid-liquid reaction between a large excess of inorganic chloride and the formula (II) acylfluoride. The reaction is carried out at a temperature higher than 100° C., under strong stirring to guarantee a good dispersion of the inorganic salt in the fluid. Alternatively to the treatment with $CaCl_2$ of step B) the formula (II) compound can be hydrolyzed obtaining the corresponding carboxylic acid which is subsequently treated with $SOCl_2$, in the presence of a tertiary amine, for example pyridine, at a temperature in the range 50°–100° C., preferably 70° C., obtaining the corresponding acylfluoride.

Step C) is described in detail hereinafter. When in step C) aldehyde is obtained, it can be further reduced according to what described in step C) to give the corresponding alcohol. Therefore the hydrogenation reaction of the step C) functional groups can be schematically represented as follows:

PFPE-CN+2H$_2$→PFPE-CH$_2$NH$_2$

PFPE-COCl+H$_2$→PFPE-CHO+HCl

PFPE-COCl+2H$_2$→PFPE-CH$_2$OH+HCl

PFPE-CHO+H$_2$→PFPE-CH$_2$OH

The process can be carried out in a continuous or discontinuous way, preferably removing HCl when it forms.

The metal fluorides used as supports can be simple, complex metal fluorides, or their mixtures, preferably selected in the group formed by $CaF_2$, $BaF_2$, $MgF_2$, $AlF_3$, more preferably $CaF_2$.

The concentration of Pd, Rh or Ru on the support is in the range 0.1%–10%, preferably 1%–2% by weight with respect to the total weight of the catalyst.

The present invention process allows to obtain the corresponding reduction compounds with yields even higher than 90%, generally higher than 95%.

It has been found by the Applicant that step C) of the present invention can also be used for the preparation of other fluorinated compounds, in particular the pefluoroalkyl compounds, preferably $C_1$–$C_{12}$, having aldehyde, alcohol and amine end groups starting from the corresponding perfluoroalkyl precursors having acylchloride, aldehyde and nitrile end groups.

The reduction step C) is furthermore applicable to the formula (IIa) compounds wherein T''' is H or Cl and T'''' is CN or COCl.

The following Examples are given for illustrative and not limitative purposes of the present invention.

EXAMPLES

Synthesis of the Precursors
PFPE-diacylchloride
Method a 50 ml of thionyl chloride and 2.5 ml of pyridine are introduced into a 500 ml glass reactor equipped with mechanical stirring. The mixture is heated at 70° C. and 250 g of carboxylic diacid perfluoropolyether having formula $HOOCCF_2O(CF_2CF_2O)_m(CF_2O)_pCF_2COOH$, wherein p/m=1 and the equivalent weight (number average molecular weight/average number of —COOH groups) is equal to 989, are fed in one hour and a half. It is maintained at said temperature until the gas evolvement stops, then it is cooled and it is let decant for one night. The lower organic phase is recovered and the thionyl chloride excess removed by distillation at reduced pressure at the temperature of 70° C. 249 g of compound are obtained, which characterized by NMR $^{19}$F and IR spectroscopy, shows to be the diacylchloride pefluoropolyether of formula (V)

$$ClCOCF_2O(CF_2CF_2O)_m(CF_2O)_pCF_2COCl \qquad (V)$$

wherein p/m=1 and m, p are such that the number average molecular weight is 2,030 and the equivalent weight is 1,015.

Method b 3 g of anhydrous $CaCl_2$, 5.6 g of perfluoropolyether diacylfluoride having the structure $FOCCF_2O(CF_2CF_2O)_m(CF_2O)_pCF_2COF$ wherein p/m=1 and the equivalent weight is equal to 780, and 5 g of perfluoropolyether diacylchloride of formula (V)

$$ClOCCF_2O(CF_2CF_2O)_m(CF_2O)_pCF_2COCl$$

wherein p/m=1 and the equivalent weight is equal to 1,024, as dispersing agent, are introduced into a 50 ml fluorinated polymeric test tube, stirred with a magnet. The mixture is heated to 120° C. and is left at said temperature for 20 hours. After cooling of the mass to room temperature it is diluted with inert fluorinated solvent (CFC 113) and the solid residue is filtered. The solvent is removed by distillation at reduced pressure and 10 g of a compound are obtained, which, characterized by NMR$^{19}$F and IR spectroscopy, shows to be the perfluoropolyether diacylfluoride of formula (V)

$$ClOCCF_2O(CF_2CF_2O)_m\ (CF_2O)_pCF_2COCl \qquad (V)$$

wherein p/m=1 and m, p are such that the number average molecular weight is 2,030 and the equivalent weight is 1,015.

PFPE-dinitrile 100 g of perfluoropolyether diester of formula $CH_3OOCCF_2O(CF_2CF_2O)_m(CF_2O)_pCF_2COOCH_3$, obtain able as described in EP 1,114,824, are reacted with gaseous ammonia (3 g) to give the corresponding diamide of formula

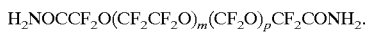
$H_2NOCCF_2O(CF_2CF_2O)_m(CF_2O)_pCF_2CONH_2$.

Said diamide, subjected to dehydration with $P_2O_5$ at the temperature of 170° C., gives 90 g of a compound which, characterized by NMR$^{19}$F and IR specroscopy, shows to be the perfluoropolyether dinitrile of formula (III):

$CNCF_2O(CF_2CF_2O)_m(CF_2O)_pCF_2CN$ (III)

wherein p/m=1 and p, m are such that the number average molecular weight of the nitrile is 1,970 and the equivalent weight is 985.

Example 1

Into a 100 ml flask, equipped with mechanical stirrer, bubbling pipe to introduce hydrogen/nitrogen, condenser connected to a bubble-counter to visualize the outflowing gas flow, dropping funnel for the perfluoropolyether dinitrile feeding 2 g of Pd/CaF$_2$ catalyst containing 1.5% by weight of Pd,
40 ml of 1,3-bis(trifluoromethyl) benzene (HFX or BTB) having a boiling temperature equal to 120° C., are introduced.

By external heating with thermostated oil bath, the solvent (HFX) is brought to reflux at a temperature of about 120° C., hydrogen is fed at a flow-rate of about 1,500 ml/h, maintaining constant the flow flowing out from the bubble-counter, and 4 g of perfluoropolyether dinitrile of structure (III):

$CN-CF_2O(CF_2CF_2O)_m(CF_2O)_pCF_2CN$ (III)

are fed, wherein p/m=1 and p, m are such that the number average molelcular weight is 1,970 and the equivalent weight is 985.

The nitrile is fed in 60 minutes. When the feeding is over, it is cooled to room temperature, under nitrogen flow, and is filtered. The solvent is removed by distillation under reduced pressure at 50° C., obtaining a compound which is analyzed by NMR$^{19}$F and $^1$H.

The analyses show a nitrile conversion equal to 100% and a selectivity in amine of formula (IV)

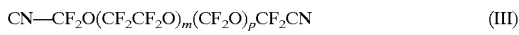
$H_2NCH_2-CF_2O(CF_2CF_2O)_m(CF_2O)_pCF_2CH_2NH_2$ (IV)

of 97.7% and a yield of 97.7%.

Example 2

Into the equipment described in the Example 1

4 g of Pd/CaF$_2$ catalyst containing 1.5% by weight of Pd,
40 ml of D 100 (mixture of perfluorobutyltetrahydrofuran and perfluoropropyltetrahydropyran having a boiling temperature of 100° C.), are introduced.

It is heated by oil bath so to bring to reflux the solvent (D 100), hydrogen is introduced with a flow-rate of about 1,500 ml/h, maintaining constant the flow flowing out from the bubble-counter, and 4 g of the perfluoropolyether dinitrile having structure (III) of the Example 1 are fed in 60 minutes. When the feeding is over, it is cooled to room temperature and one proceeds as in the Example 1. A nitrile conversion of 100% and a selectivity in amine of formula (IV) of 97.8% and a yield of 97.8%, are obtained.

Example 3

Into the same equipment described in the previous Examples 4 g of Pd/CaF$_2$ (recovered by filtration at the end of the Example 2),
40 ml of D 100, are introduced.

By heating at a temperature of 100° C., 1,500 ml/h of H$_2$ and 4 g of the perfluoropolyether dinitrile (III) of the Example 1 are fed. When feeding is over, the compound is isolated according to the methods described in the Example 1. The amine of formula (IV) is obtained with a conversion of nitrile (III) of 100% and a yield in amine of formula (IV) of 97.5%.

Example 4 (Comparative)

Into the equipment described in the Example 1
0.5 g g of Pd/C containing 10% by weight of Pd,
40 ml of HFX, are introduced.

It is heated by external oil bath up to 120° C., hydrogen is introduced with a 1,500 ml/h flow-rate and 5 g of perfluoropolyether dinitrile (III) of the Example 1 are fed. The reaction compound is isolated according to the methods described in the Example 1. The NMR ($^{19}$F and $^1$H) analyses show a conversion of the perfluoropolyether dinitrile of 100% and a yield in amine of formula (IV) of 32.6%.

Example 5 (Comparative)

Into the equipment described in the Example 1
1 g of Pd/CaCO$_3$ containing 5% by weight of Pd,
40 ml of HFX, are introduced.

With the methods described in the Example 1, 5 g of perfluoropolyether dinitrile of formula (III) are fed in hydrogen flow in 60 minutes. A conversion of the perfluoropolyether dinitrile of 100% and a yield in perfluoropolyether diamine of 29.2% are obtained.

Example 6 (Comparative)

Into the equipment described in the Example 1
1 g of Pd/BaSO$_4$ containing 5% by weight of Pd,
40 ml of HFX, are introduced.

With the methods described in the Example 1, 5 g of perfluoropolyether dinitrile (III) of the Example 1 are fed in 90 minutes. A conversion of the perfluoropolyether dinitrile of 100% and a yield in perfluoropolyether diamine of 14% are obtained.

Example 7 (Comparative)

Into the equipment of the Example 1
1 g of Pd/BaSO$_4$ containing 5% by weight of Pd,
40 ml of D100, are introduced.

With the methods described in the Example 1, 5 g of perfluoropolyether dinitrile (III) of the Example 1 are fed in hydrogen flow in 90 minutes. The perfluoropolyether dinitrile results converted in a mixture of compounds not containing PFPE-diamine.

Example 8 (Comparative)

Into the equipment of the Example 1
0.27 g of Co-Raney containing 50% by weight of Co,
40 ml of HFX, are introduced.

With the methods described in the Example 1, 5 g of perfluoropolyether dinitrile (III) of the Example 1 are fed in hydrogen flow in 60 minutes. No conversion of the reactant (III) is noticed.

Example 9

Into the same equipment of the Example 1

3.7 g of Pd/CaF$_2$ containing 1.5% of Pd, 40 ml of HFX, are introduced.

With the same methods of the Example 1, 3.7 g of perfluoropolyether diacylchloride of formula (V) are fed in 30 minutes, in hydrogen flow:

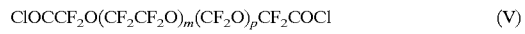

ClOCCF$_2$O(CF$_2$CF$_2$O)$_m$(CF$_2$O)$_p$CF$_2$COCl  (V)

wherein p/m=1 and m, p are such that the number average molecular weight is 2,030 and the equivalent weight is 1,015.

When the PFPE-diacylchloride feeding is over, the mass is left at the reaction temperature and in hydrogen flow for further 30 minutes, then it is cooled to room temperature and the compound is isolated and characterized according to the methods reported in the Example 1. A conversion of the perfluoropolyether diacylchloride of 100% and a yield in perfluoropolyether dialdehyde of formula (VI):

OHCCCF$_2$O(CF$_2$CF$_2$O)$_m$(CF$_2$O)$_p$CF$_2$CHO  (VI)

of 96.3% are obtained. The catalyst recovered from this test, by filtration, is used for two additional reduction tests exactly carried out with the same reactant aliquots and operating methods. The perfluoropolyether dialdehyde is isolated with a yield, for both tests, of 96%.

Example 10

Into the same equipment of the Example 1

3.67 g of Pd/AlF$_3$ containing 1.5% of Pd, 40 ml of HFX, are introduced.

By operating as described in the Example 1, 3.67 g of perfluoropolyether diacylchloride (V) of the Example 10 are fed in 30 minutes, in hydrogen flow. The compound is isolated according to the methods described in the Example 10. A conversion of the perfluoropolyether diacylchloride of 100% and a yield in perfluoropolyether dialdehyde of 96.7% are obtained.

Example 11 (Comparative)

Into the equipment described in the Example 1

0.6 g of Pd/C containing 10% by weight of Pd, 40 ml of HFX, are introduced.

One operates according to the methods described in the Example 1, by feeding in hydrogen flow 4 g of perfluoropolyether diacylchloride (V) of the Example 10. A conversion of the perfluoropolyether diacylchloride of 100% and a yield in perfluoropolyether dialdehyde of 16.1% are obtained.

Example 12

Into the same reactor of the Example 1

4 g of Pd/CaF$_2$ containing 1.5% by weight of Pd, 40 ml of HFX, are introduced.

The temperature is brought to 80° C., hydrogen is introduced with a flow rate equal to 1,500 ml/h and 4 g of perfluoropolyether diacylchloride (V) of the Example 10 are fed in 30 minutes. When feeding is over, it is cooled to room temperature in nitrogen flow and is filtered. The solvent is removed by distillation at 50° C. under reduced pressure. The NMR $^{19}$F and $^1$H analyses show a conversion of the perfluoropolyether diacylchloride of 100% and a yield in alcohol of formula (VII):

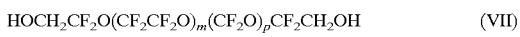

HOCH$_2$CF$_2$O(CF$_2$CF$_2$O)$_m$(CF$_2$O)$_p$CF$_2$CH$_2$OH  (VII)

of 97.5%.

Example 13

The Example 12 has been exactly repeated but by using, as solvent, D100 (mixture of perfluorobutyltetrahydrofuran and perfluoropropyltetrahydropyran having a boiling temperature of 100° C.) at the place of HFX. A conversion of the perfluoropolyether diacylchloride of 100% and a yield in alcohol of formula (VII):

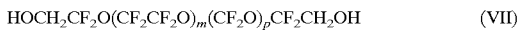

HOCH$_2$CF$_2$O(CF$_2$CF$_2$O)$_m$(CF$_2$O)$_p$CF$_2$CH$_2$OH  (VII)

of 97% are obtained. The catalyst has been recovered and reused in other 4 repetitive subsequent tests, in each of them the catalyst isolated from the preceding test has been reused, obtaining in each test a conversion of 100% and a yield of 97%.

Example 14

Into the same reactor of the Example 1

4 g of Pd/CaF$_2$ containing 1.5% by weight of Pd, 40 ml of HFX, are introduced.

With the same operating modalities of the Example 13, 3.5 g of perfluoropolyether dialdehyde (VI) of the Example 10 are fed in hydrogen flow. The reduction compound is isolated and characterized likewise as described in the Example 13. A conversion of the perfluoropolyether dialdehyde of 100% and a yield in perfluoropolyether alcohol of formula (VII) higher than 99% are obtained.

Example 15

Into the equipment described in the Example 1 there are fed:

4.8 g of Pd/CaF$_2$ containing 5% by weight of Pd, 59 g of perfluoropolyether acylchloride of formula (VIII)

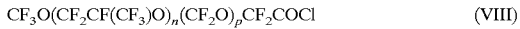

CF$_3$O(CF$_2$CF(CF$_3$)O)$_n$(CF$_2$O)$_p$CF$_2$COCl  (VIII)

wherein n/p=25 and n, p are integers such that the number average molecular weight is 700. The reactor is heated by an oil bath so to bring the temperature to 120° C., then hydrogen is fed at a flow-rate of 8,000 ml/h for about 3 h. It is then cooled to room temperature under nitrogen flow. The reaction compound is isolated. The NMR ($^{19}$F and $^1$H) analysis of the compound shows a conversion of 95% of the starting perfluoropolyether acylchloride and a yield in the perfluoropolyether aldehyde of formula (IX):

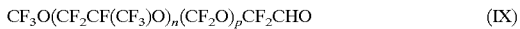

CF$_3$O(CF$_2$CF(CF$_3$)O)$_n$(CF$_2$O)$_p$CF$_2$CHO  (IX)

of 95%.

What is claimed is:

1. A process for the preparation of perfluoropolyethers of formula:

T—CFX'—O—R$_f$—CFX—T'  (I)

wherein:

T is —F, C$_1$–C$_3$ perfluoroalkyl, —CH$_2$OH, —CH$_2$NH$_2$, or —CHO;

T'=T with the proviso that when T is F or $C_1$–$C_3$ perfluoroalkyl, T' is —$CH_2OH$, —$CH_2NH_2$, or —CHO;

X and X' are equal to or different from each other, and are —F or —$CF_3$;

$R_f$ is selected from:

—$(C_2F_4O)_m(CF_2CF(CF_3)O)_n(CF_2O)_p(CF(CF_3)O)_q$— wherein the sum n+m+p+q ranges from 2 to 200, the (p+q)/(m+n+p+q) ratio is lower than or equal to 10:100, the n/m ratio ranges from 0.2 to 6; m, n, p, and q are equal to or different from each other and when m and n range from 1 to 100, then p and q and a range from 0 to 80; the units with n, m, p, and q indexes being statistically distributed along the chain;

—$(CF_2CF_2CF_2O)_r$— wherein r ranges from 2 to 200,

—$(CF(CF_3)CF_2O)_s$— wherein s ranges from 2 to 200, comprising the following steps:

A) preparation of perfluoropolyethers of formula

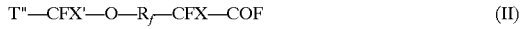

T"—CFX'—O—$R_f$—CFX—COF       (II)

wherein T" is —COF, —F, or $C_1$–$C_3$ perfluoroalkyl, X, X', and $R_f$ are as above, by reduction of the corresponding perfluoropolyethers containing peroxidic bonds, with gaseous hydrogen in the presence of a catalyst formed by metals of the VIII group supported on metal fluorides, at a temperature from 20° C. to 140° C., and at a pressure between 1 and 50 atm;

B) treatment of the formula (II) compounds with inorganic chlorides by heating at a temperature in the range 100°–150° C. and obtaining perfluoropolyethers having acylchloride —COCl end groups;

B') treatment of the formula (II) acylfluoride or of the corresponding ester or of the corresponding acylchloride with gaseous ammonia, obtaining the corresponding amide, which is subsequently dehydrated at a temperature in the range 150°–200° C., and obtaining perfluoropolyethers with nitrile —CN end groups;

C) obtaining the compound (I) by reduction of the perfluoropolyethers with acylchloride end groups, obtained in step B), or with nitrile end groups, obtained in step B'), of formula (IIa):

T'"—CFX'—O—$R_f$—CFX—T""       (IIa)

wherein:

T'"=—F, $C_1$–$C_3$ perfluoroalkyl, —CN, or —COCl,

T""=T'" with the proviso that when T'" is —F or $C_1$–$C_3$ perfluoroalkyl, T"" is —CN or —COCl, with gaseous hydrogen in the presence of a catalyst constituted by metals of the VIII group selected from Pd, Rh, Ru, supported on solid metal fluorides, at a temperature from 20° C. to 150° C., and at a pressure between 1 and 50 atm optionally in the presence of inert solvents.

2. A process according to claim 1, wherein $R_f$ is selected from one of the group consisting of:

—$(CF_2CF_2O)_m$—$(CF_2O)_p$— and

—$(CF_2CF(CF_3)O)_n$—$(CF_2O)_p$—$(CF(CF_3)O)_q$.

3. A process according to claim 1, wherein the metal fluoride of step C) is selected from the group formed by $CaF_2$, $BaF_2$, $MgF_2$, or $AlF_3$.

4. A process according to claim 1, wherein the concentration of the VIII group metal on the metal fluoride of the catalyst of step C) is comprised between 0.1% and 10% with respect to the total weight of the catalyst.

5. The process of claim 1, wherein the (p+q)/(m+n+p+q) ratio is between 0.5:100 and 4:100.

6. The process of claim 1, wherein the n/m ratio ranges from 0.5 to 3.

7. The process of claim 1, wherein the m and n range from 1 to 80.

8. The process of claim 1, wherein the p and q range from 0 to 50.

9. The process of claim 1, wherein the inorganic, chlorides are $CaCl_2$.

10. The process of claim 1, wherein the amide is dehydrated with $P_2O_5$.

11. The process of claim 1, wherein the temperature of obtaining the compound (I) by reduction of the perfluoropolyethers with acylchloride end groups, obtained in step B), or with nitrile end groups, obtained in step B'), of formula (IIa) is from 80° C. to 120° C.

12. The process of claim 1, wherein the pressure of obtaining the compound (I) by reduction of the perfluoropolyethers with acylchloride end groups, obtained in step B), or with nitrile end groups, obtained in step B'), of formula (IIa) is between 1 and 10 atm.

13. The process of claim 3, wherein the metal fluoride is $CaF_2$.

14. The process of claim 4, wherein the concentration of the VIII group metal on the metal fluoride of the catalyst of step C) is comprised between 1% and 2% with respect to the total weight of the catalyst.

15. The process of claim 1, wherein the corresponding amide in B') is subsequently dehydrated at a temperature of 170° C.

* * * * *